(12) United States Patent
Gresset et al.

(10) Patent No.: US 10,820,524 B2
(45) Date of Patent: Nov. 3, 2020

(54) WRAPPING DEVICE AND ROUND BALER

(71) Applicant: DEERE & COMPANY, Moline, IL (US)

(72) Inventors: Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 154 days.

(21) Appl. No.: 15/995,378

(22) Filed: Jun. 1, 2018

(65) Prior Publication Data

US 2018/0352749 A1 Dec. 13, 2018

(30) Foreign Application Priority Data

Jun. 12, 2017 (DE) .................... 10 2017 209 884

(51) Int. Cl.
*A01F 15/07* (2006.01)
*A01F 15/12* (2006.01)

(52) U.S. Cl.
CPC .......... *A01F 15/0715* (2013.01); *A01F 15/12* (2013.01); *A01F 2015/0725* (2013.01)

(58) Field of Classification Search
CPC ...... A01F 15/07; A01F 15/0715; A01F 15/12; A01F 2015/0725; B65B 13/04; B65B 13/22; B65B 41/00
USPC ......... 53/118, 389.1, 587, 211, 389.2, 389.3, 53/389.4
See application file for complete search history.

(56) References Cited

U.S. PATENT DOCUMENTS

| | | | | |
|---|---|---|---|---|
| 3,895,573 A | * | 7/1975 | Phillips | A01F 15/07 100/88 |
| 3,914,926 A | * | 10/1975 | Braunberger | A01F 15/07 56/341 |
| 4,409,784 A | * | 10/1983 | VanGinhoven | A01F 15/0715 100/5 |
| 4,510,741 A | * | 4/1985 | Campbell | A01F 15/07 100/88 |
| 4,528,794 A | * | 7/1985 | Thierstein | B65H 29/006 242/528 |
| 4,768,431 A | * | 9/1988 | Merritt, III | A01F 15/0715 100/15 |
| 4,790,125 A | * | 12/1988 | Merritt, III | A01F 15/0715 226/176 |
| 4,802,395 A | * | 2/1989 | Merritt, III | A01F 15/0715 56/341 |

(Continued)

FOREIGN PATENT DOCUMENTS

| | | | | |
|---|---|---|---|---|
| DE | 3331671 A1 | * | 3/1985 | ............. A01F 15/00 |
| DE | 3331671 A1 | | 3/1985 | |

OTHER PUBLICATIONS

German Search Report issued in counterpart application No. 102017209884.8 dated Jan. 31, 2018. (10 pages).

*Primary Examiner* — Hemant Desai
*Assistant Examiner* — Jacob A Smith

(57) ABSTRACT

A wrapping device of a round baler includes means for feeding an enveloping material through a feed gap into a pressing chamber of the round baler. The wrapping device further includes a directing means configured to maintain the enveloping material in contact with at least one pressing means of the round baler. The at least one pressing means is located adjacently below the feed gap.

12 Claims, 3 Drawing Sheets

(56) References Cited

U.S. PATENT DOCUMENTS

| | | | | |
|---|---|---|---|---|
| 4,838,016 | A * | 6/1989 | Frogbrook | A01F 15/07 56/341 |
| 4,896,477 | A * | 1/1990 | Wagstaff | A01F 15/0715 53/118 |
| 4,938,004 | A * | 7/1990 | Merritt | A01F 15/0715 53/399 |
| 4,956,968 | A * | 9/1990 | Underhill | A01F 15/0715 100/88 |
| 5,036,642 | A * | 8/1991 | Underhill | A01F 15/0715 53/118 |
| 5,079,898 | A * | 1/1992 | Springs | A01F 15/141 53/389.3 |
| 5,129,208 | A * | 7/1992 | Van Zee | A01F 15/0715 53/118 |
| 5,319,899 | A * | 6/1994 | Jennings | A01F 15/0715 53/118 |
| 5,448,873 | A * | 9/1995 | Jennings | A01F 15/0715 53/118 |
| 5,479,767 | A * | 1/1996 | McClure | A01F 15/07 100/15 |
| 5,557,906 | A * | 9/1996 | Viaud | A01F 15/0715 53/118 |
| 5,581,973 | A * | 12/1996 | Underhill | A01F 15/0715 53/118 |
| 6,722,100 | B1 * | 4/2004 | Underhill | A01F 15/0715 53/118 |
| 8,522,512 | B2 * | 9/2013 | Paillet | A01F 15/0715 53/116 |
| 8,601,770 | B2 * | 12/2013 | Paillet | A01F 15/0715 53/211 |
| 9,016,032 | B2 * | 4/2015 | Chapon | A01F 15/071 53/203 |
| 2003/0230046 | A1 * | 12/2003 | Viaud | A01F 15/0715 53/118 |
| 2006/0242931 | A1 * | 11/2006 | Ryse | A01F 15/0715 53/587 |
| 2009/0272072 | A1 * | 11/2009 | Paillet | A01F 15/0715 53/118 |
| 2010/0236190 | A1 * | 9/2010 | Paillet | A01F 15/0715 53/203 |
| 2012/0240516 | A1 * | 9/2012 | Chapon | A01F 15/0715 53/203 |
| 2012/0240517 | A1 * | 9/2012 | Chapon | A01F 15/0715 53/203 |
| 2012/0240520 | A1 * | 9/2012 | Gresset | A01F 15/0715 53/389.1 |
| 2014/0261021 | A1 * | 9/2014 | Smith | B23P 6/00 100/8 |
| 2015/0305244 | A1 * | 10/2015 | Gresset | B65B 41/12 53/587 |
| 2016/0366829 | A1 * | 12/2016 | Gresset | B65B 41/16 |

* cited by examiner

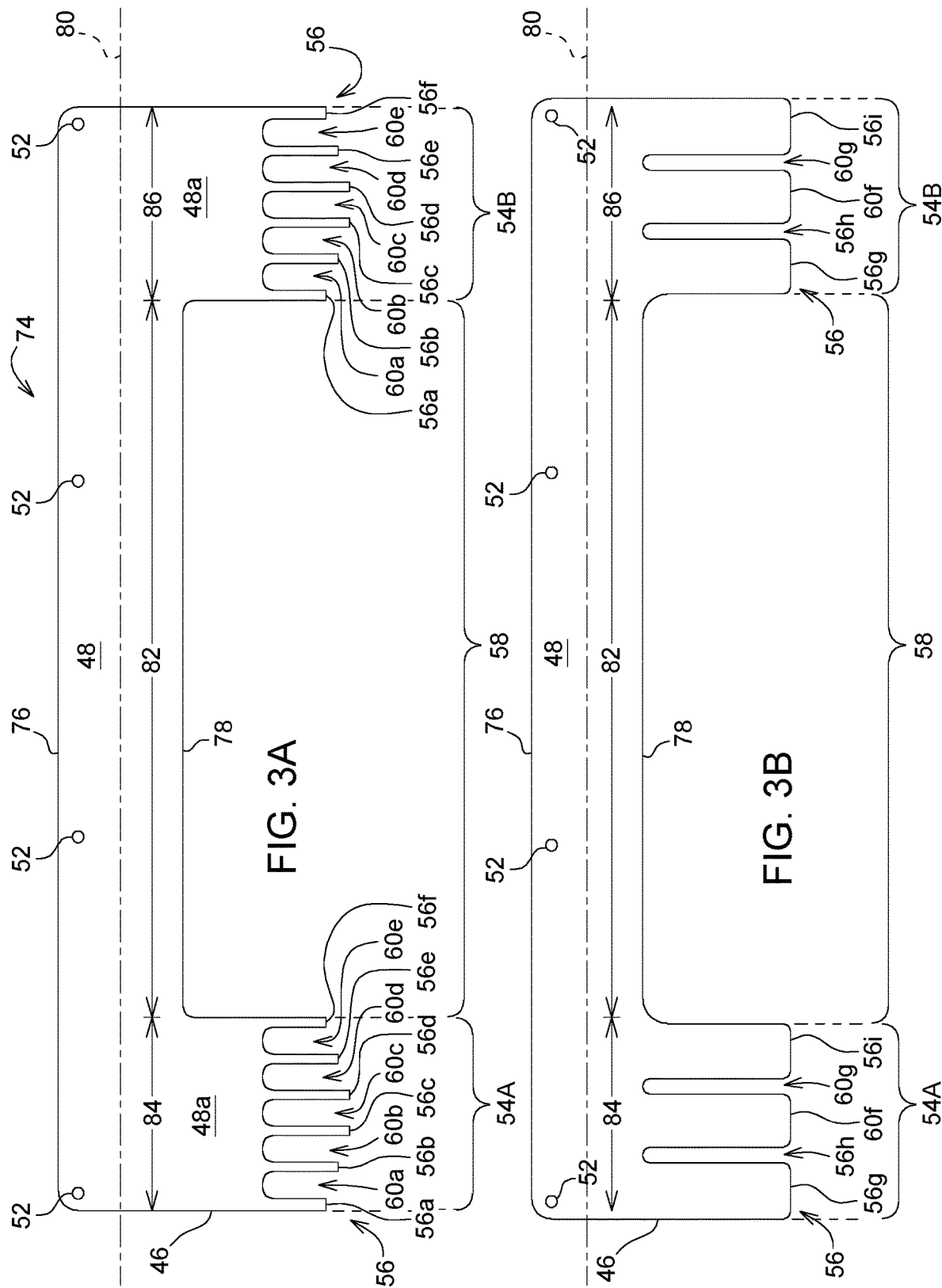

WRAPPING DEVICE AND ROUND BALER

RELATED APPLICATIONS

This application claims priority to German Patent Application Ser. No. 102017209884.8, filed Jun. 12, 2017, the disclosure of which is hereby incorporated by reference in its entirety.

FIELD OF THE DISCLOSURE

The present disclosure relates to a wrapping device for a round baler, and in particular to a wrapping device with means for feeding an enveloping material through a feed gap to a round bale arranged in a pressing chamber, and to a round baler comprising a wrapping device.

BACKGROUND

Conventional wrapping devices are used on round balers in order to wrap a round bale, which is formed in a pressing chamber of the round baler, with an enveloping material such as, for example, a mesh, a film or a similar material. The enveloping material may be semipermeable, breathable or water-repellant. The wrapping step occurs before the round bale is discharged from the round baler and then deposited on the underlying surface, or transferred to a further device such as, for example, a winding device.

Round balers of this type are used both in the agricultural and industrial spheres. Corresponding agricultural balers serve, for example, for forming crop bales, i.e., in the manner of round bales, and frequently produce at least substantially round-cylindrical bales made of crop from straw, hay, chaff, etc. Industrial balers are used in the compaction of garbage, textiles or other materials or in the pressing thereof to form bales.

Conventional wrapping devices guide an enveloping material through a feed gap onto a round bale formed in a pressing chamber, and therefore the enveloping material can wrap the round bale after the formation of the bale is ended. It may occur in this connection that the enveloping material is only fed incompletely, if at all, to the round bale at the beginning of the wrapping operation, or that the enveloping material is not grasped by the bale and therefore only incomplete wrapping, if any at all, takes place. Frequently, an operator determines only after the round bale has been ejected that the wrapping operation has not been completed successfully.

SUMMARY

In one embodiment of the present disclosure, a wrapping device for a round baler is provided with means for feeding an enveloping material through a feed gap to a round bale arranged in a pressing chamber. In particular, the round baler is an agricultural baler for forming round-cylindrical bales. At least one directing means is provided which can keep the enveloping material in contact at least in regions with at least one pressing means of the round baler, the pressing means being adjacent, at the bottom, to the feed gap and in particular being drivable. In this manner, the enveloping material can be kept on the pressing means or in the feed gap during a wrapping operation, but also before or after such an operation or during the formation of a bale, and therefore a reliable feed of the enveloping material to a round bale formed in the pressing chamber is assisted. Contact of the enveloping material with other pressing means, for example, a pressing roller arranged above the feed channel, can thus also be counteracted, and therefore the risk of an inadvertent winding of material around such a pressing means can be reduced. In particular, however, it is also possible to prevent enveloping material from blowing out of the feed gap, as may occur, for example, due to a draft occurring by movement of the baler or due to windy environmental conditions.

It is particularly favorable if the directing means projects at least in regions into the feed gap such that the directing means can keep the enveloping material in contact with the at least one pressing means directly in the feed gap. If, moreover or alternatively, the directing means projects permanently into the feed gap, the directing means can keep the enveloping material in contact with the pressing means or the feed roller not only during a certain phase, for example, at the beginning of a bale formation process or wrapping process, but rather continuously.

In particular, the pressing means adjacent to the feed gap can be designed as a pressing roller, as a pressing belt or else as a feed roller mounted upstream of the feed gap. It is also particularly favorable if the feed gap is bounded by pressing means of the round baler. The pressing means can be designed, for example, as a flexible pressing means, for example, in the manner of pressing straps. However, the pressing means are designed in the manner of pressing rollers.

It is conceivable for the directing means to be designed to be stiff or at least substantially stiff and manufactured, for example, from a plastic of a certain rigidity or from a metal. However, the directing means may be formed of elastic or a flexible design at least in some regions, and therefore the enveloping material can be kept stably or continuously against the pressing means irrespective of the thickness of the enveloping material or any deposits or the like, without clogging or jamming occurring. The directing means is pre-stressed in the direction of the at least one pressing means.

The directing means or a basic body of the directing means extends at least substantially over the width of the pressing chamber. The directing means or the basic body thereof can thereby be attached, for example, to the wrapping device in a simple manner. However, it can also be provided that the directing means does not reach as far as side walls of the round baler or does not cover the entire pressing chamber, for example, in order not to intervene with other working means or working devices.

Furthermore, the directing means can have at least one region, such as a central region, in which the directing means does not act on the enveloping material or is not in engagement therewith, and therefore no directing-means-assisted contact of the enveloping material with the at least one pressing means is brought about in this region. This is favorable, for example, whenever the enveloping material is of differing design or is textured in this region. In particular, the enveloping material can be formed in an adhering or adhesively bonding manner or can be coated in this region. In particular, the enveloping material in the adhering or adhesively bonding region is not brought into contact or engagement with the directing means in order to prevent adhesive bonding/adhering of the enveloping material to the directing means.

It is conceivable for the directing means to be of a single-part design over its entire effective width or to be of elastic or flexible design per se. If, however, in a region facing the pressing chamber, the directing means is of a finger-like design at least in regions, favorable behavior arises or a differing holding pressure can be obtained depending on the configuration. For this purpose, the directing means can have side regions extending transversely with respect to the running direction of the pressing means which is adjacent at the bottom, wherein the side regions are formed at least in regions with fingers facing the pressing chamber, wherein a central region is formed between the side regions. The central region may extend transversely with respect to the running direction of the pressing means adjacent at the bottom, being in the form of a cutout or a recess and in which no fingers are provided.

The fingers can be formed overall or in regions in an identical length or width or in a different length, e.g., in a stepped form, or in a wide or flat form. However, other designs are also conceivable. For example, a finger gap can be varied in its width or shaping between the fingers. If the fingers are of a stepped design in such a manner that the central fingers are of a longer design than the outer fingers, this can facilitate insertion of the enveloping material. If, however, the fingers are of a flat design, this can facilitate grasping of the enveloping material.

If a round baler is equipped with a wrapping device of this type, discharge of a round bale which is only partially wrapped, if at all, can be prevented. The round baler may be an agricultural baler for forming round-cylindrical bales. However, the baler may also be used in the industrial sphere, for example, for forming bales made of paper, garbage, fabric or other materials.

The round baler can have a pressing chamber which is variable in terms of size, or the pressing means can be formed at least in regions by in particular flexible pressing means in the manner of pressing straps. However, the round baler may have a pressing chamber which is at least substantially invariable in terms of size, or the pressing chamber is determined at least in regions by pressing means, such as in the form of pressing rollers.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIGS. 3a and 3b are each an embodiment of a directing means.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
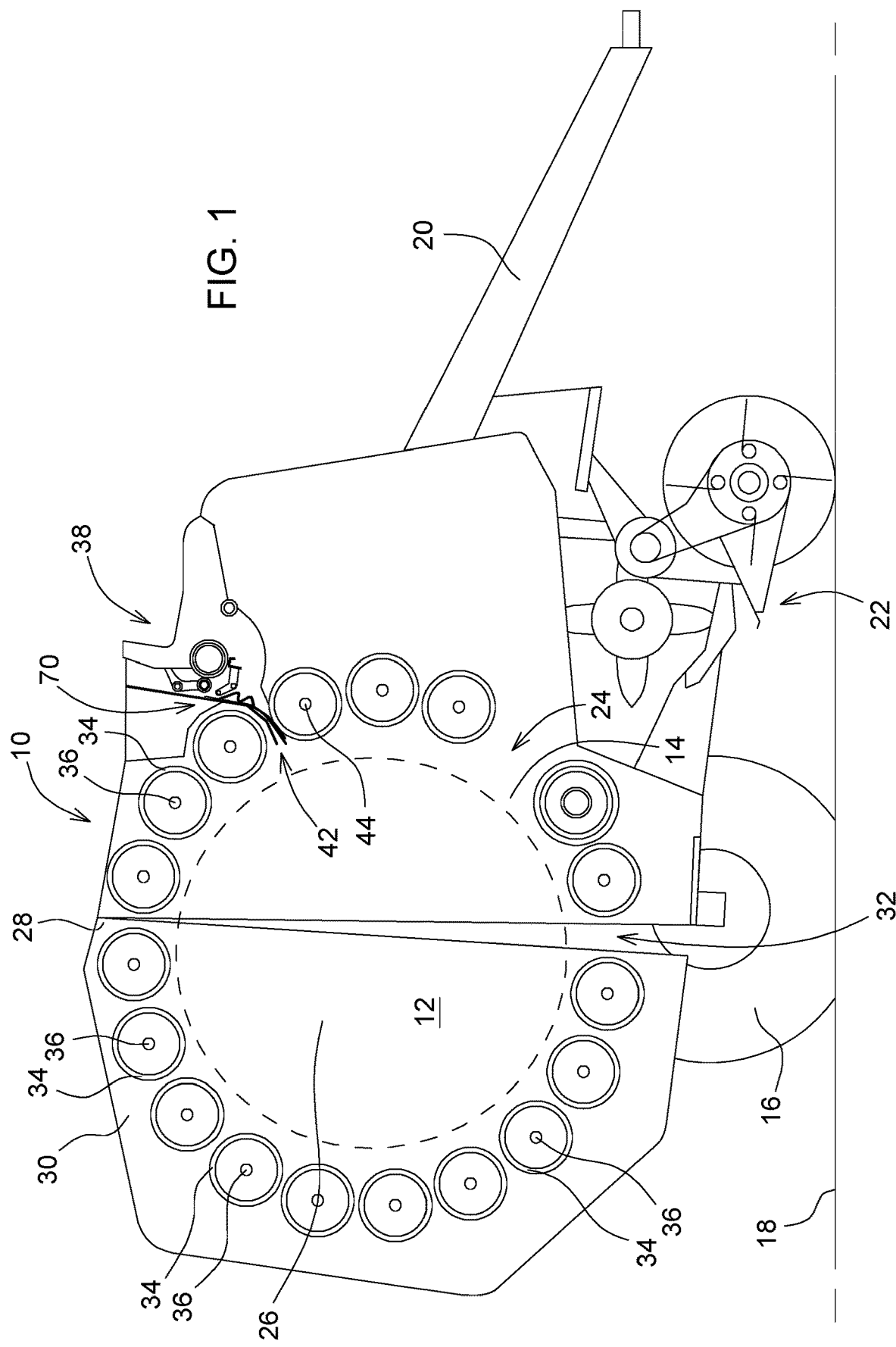
FIG. 1 is a schematic side view of an agricultural round baler with pressing means and a wrapping device.

FIG. 1 illustrates a round baler 10 for pressing a round bale 12, where the round baler has a first housing part 14 supported on an underlying surface 18 by means of wheels 16 and which is connectable by means of a draw bar 20 to a towing vehicle (not shown) such as, for example, a tractor.

A pickup device 22 for picking up and feeding crop is located in a manner known per se on a lower side of the first housing part 14 at the front with respect to a forward direction of travel, the pickup device conveying cut crop through a feed channel 24 into a pressing chamber 26, wherein the first housing part 14 surrounds a front part of the pressing chamber 26. A bearing 28 for a pivotable second housing part 30 which surrounds a rear part of the pressing chamber 26 is located at a rear upper corner region of the first housing part 14. In the open state, the second housing part 30 opens up an opening 32, through which a round bale 12 pressed by the round baler 10 can be deposited or unloaded or discharged. The pivotable second housing part 30 can be actuated (opened and closed) by means of servomotors (not shown) and therefore constitutes an outlet flap for a round bale 12 which has been pressed in the pressing chamber 26.

According to the illustrated embodiment, the pressing chamber 26 of the round baler 10 is designed, for example, invariably in terms of size as a pressing chamber with pressing rollers 34. For this purpose, the round baler 10 has a plurality of pressing rollers 34 running parallel to one another (by way of example, only a few pressing rollers 34 are shown), the roller axles 36 of which are placed on a circular arc when the second housing part 24 is closed, and of which at least some are driven. In addition to pressing and shaping, the pressing rollers 34 serve in particular also for producing rotation or maintaining rotation of the round bale 12 arranged in the pressing chamber 20. The round baler 10 is depicted here by way of example with a slightly open rear housing part 24 in order to illustrate the opening 32. However, the housing part is closed during a pressing operation.

Furthermore, the round baler 10 includes a wrapping device 38 which is equipped with a supply roller (only shown by way of indication) for enveloping material 40. Provided directly below the feed gap 42 or adjacent to the latter is a feed roller 44 which, apart from its position, is identical to the other pressing rollers 34 and can be driven in a rotatory manner therewith via a drive (not shown).

After the actual baling operation, i.e., the picking up of crop and formation of a round bale 12 by the pressing rollers 34, is finished, driving over the underlying surface 18 is interrupted since the round baler 10 is filled with the round bale and no further crop should be or can be picked up into the pressing chamber 26. At this time, the wrapping device 38 is also activated, a wrapping operation connected to the baling operation is initiated and the enveloping material 40 is brought from the supply roller through a feed gap 42 into the pressing chamber 26 and onto the bale 12. By continuing rotation of the round bale 12 located in the pressing chamber 26, the enveloping material 40 is wound around the round bale 12 in such a manner that the wrapping material wraps around a circumferential surface of the round bale 12. After a wrapping operation is completed, the round bale 12 is deposited through the opening 32 via an unloading ramp (not shown) on the underlying surface 18 by means of an opening defined in the second housing part 30 which acts in the manner of an outlet flap. Driving with the round baler 10 is then resumed and a new baling operation begins.

Figure 2:
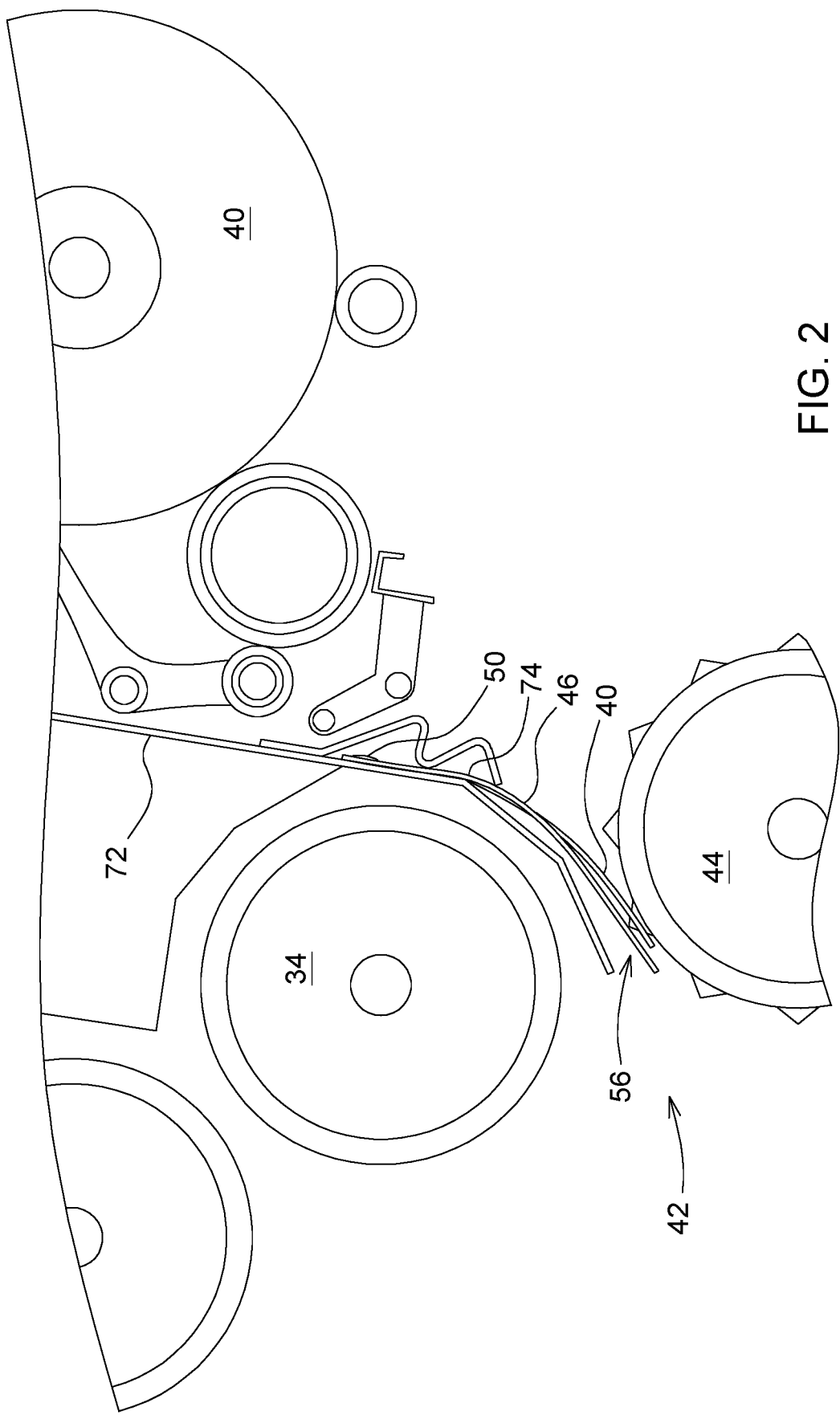
FIG. 2 is an enlarged cutout of FIG. 1, in which the wrapping device together with a directing means is illustrated in more precise detail.

Reference is now made to FIG. 2 in which the wrapping device 38 is shown in an enlarged manner. According to this embodiment, the wrapping device 38 is designed in a known manner. A feed system 70 supplies the enveloping material 40 to the feed gap 42 in such a manner that the enveloping material is grasped by the driven feed roller 44 and conveyed in the direction of the bale 12. According to the present embodiment, the enveloping material 40 is brought at least substantially from above onto the feed roller 44, as a result of which the enveloping material 40 can be grasped and carried along in a simple manner by the latter. Furthermore, the wrapping device 38 has a directing means 46 which keeps the enveloping material 40 at least substantially continuously in contact with the feed roller 44. The directing means 46 includes a support member 72 that is positioned proximate to the feed gap 42, and a guide member 74 that is attached to the support member 72.

Reference is now also made to FIGS. 3a and 3b, in which the guide member 74 of the directing means 46 is illustrated in two different embodiments. In the two embodiments, the guide member 74 has a substantially flat basic body 48 which is composed of a flexible or elastic material, for example, a plastic material. The basic body 48 is connected at one end, i.e., a first edge 76, to the support member 72 via fastening means 50 which are illustrated only by way of indication in FIG. 2 and interact with openings 52 in the basic body 48. At the other end, i.e., a second edge 78 opposing the first edge 76, the second edge 78 defines a first lateral outer region 54A, a second lateral outer region 54B, and a central region 58. The central region 58 is disposed between the first lateral outer region 54A and the second lateral outer region 54B relative to a transverse axis 80 of the guide member 74. The transverse axis of the guide member extends parallel with the feed roller 44. The basic body 48 is of a finger-like design in the respectively first and second lateral outer regions 54A, 54B, or it has fingers 56 which extend away from the basic body 48 and away from the first edge 76. According to the present embodiment, no fingers 56 are provided in a central region 58 of the second edge 78 of the body 48, and this will be discussed in more detail below. During operation, the fingers 56 extend into the feed gap 42 in such a manner that they lie against the lower feed roller 44 and keep the enveloping material 40 in contact with the lower feed roller 44.

According to the embodiment shown in FIG. 3a, in each case six fingers 56a-56f of differing length are provided in the respective first and second lateral outer regions 54A, 54B, wherein a basic body extension 48a extending only over the first and second lateral outer regions 54A, 54B is provided between the basic body 48 and the actual fingers 56a-56f. The fingers 56a and 56f, 56b and 56e and also 56c and 56d are in each case formed in a substantially identical length. Finger gaps 60a-60d are provided between the fingers 56a-56f.

According to FIG. 3b, the three fingers 56g-56i of the second embodiment are correspondingly arranged in the first and second lateral outer regions 54A, 54B of the basic body 48 and extend directly away from the regions. However, fingers 56g-56i of identical length are now provided here, which fingers are of a flatter or wider design particularly in comparison to the fingers 56a-56f of the first embodiment (FIG. 3a). Finger gaps 60f, 60g, which are of significantly narrower design in comparison to the finger gaps 60a-60e according to the first embodiment in FIG. 3a, are provided between the fingers 56g-56i.

In addition to the embodiments shown in FIGS. 3a and 3b, the directing means 46 can also be formed integrally or divided or segmented in a differing manner. In particular, differing finger/finger gap numbers and designs/formations are possible. This is to achieve a differing press-on or holding behavior or a different pre-stress, a different spring behavior of the directing means 46 or of the fingers 56. Furthermore, as already mentioned, the central region 58 of the directing means may be provided with a cutout in which no fingers are provided. The cutout or central region 58 includes a length 82 along the transverse axis that is greater than a length 84 of the first lateral outer region 54A or a length 86 of the second lateral outer region 54B. In other words, the length 84 of the first lateral outer region 54A and the length 86 of the second lateral outer region 54B are both less than the length 82 of the central region 58. The cutout serves for using enveloping material with adhering means, for example, an adhesively bonding region, which can be provided on that side of the enveloping material which faces the directing means in the central region mentioned. Under some circumstances, the enveloping material may be able to remain adhering in this region to fingers on a directing means without a cutout, i.e., with fingers also formed in the central region, and would counterproductively not be able to be guided into the pressing chamber. The cutout in the central region of the directing means therefore permits the use of the directing means when using enveloping material with and also without adhesive strips in the central region mentioned.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wrapping device for a round baler, the wrapping device comprising:
    a pressing roller and a feed roller disposed in parallel and defining a feed gap therebetween;
    a support member positioned proximate the feed gap;
    a guide member attached to the support member, the guide member including a body having a first edge attached to the support member and an opposing second edge defining a first lateral outer region, a second lateral outer region, and a central region disposed between the first lateral outer region and the second lateral outer region relative to a transverse axis of the guide member;
    wherein the first lateral outer region includes a plurality of fingers disposed on the second edge and the second lateral outer region includes a plurality of fingers disposed on the second edge, wherein the plurality of fingers of each of the first lateral outer region and the second lateral outer region extend away from the first edge of the body and into the feed gap such that an enveloping material is positionable between and engageable by the plurality of fingers of each of the first lateral outer region and the second lateral outer region, and the feed roller; and
    wherein the central region of the second edge does not extend into the feed gap such that the enveloping material is not engageable by the central region of the guide body.

2. The wrapping device set forth in claim 1, wherein the plurality of fingers are permanently disposed within the feed gap for continuously positioning the enveloping material against the feed roll.

3. The wrapping device set forth in claim 1, wherein the guide member is an elastic material.

4. The wrapping device set forth in claim 3, wherein the guide member is a plastic material.

5. The wrapping device set forth in claim 1, wherein the transverse axis of the guide member extends parallel with the feed roller.

6. The wrapping device set forth in claim 1, wherein the first lateral outer region and the second lateral outer region each includes a length along the transverse axis that is less than a length of the central region along the transverse axis.

7. A round baler for forming a bale of material, the round baler comprising:
- a housing defining a pressing chamber for forming the bale;
- a pressing roller and a feed roller supported by the housing within the pressing chamber, wherein the pressing roller and the feed roller are disposed in parallel, extend across a width of the pressing chamber, and define a feed gap therebetween;
- a feed system operable to feed an enveloping material through the feed gap;
- a support member positioned proximate the feed gap;
- a guide member attached to the support member, the guide member including a body having a first edge attached to the support member and an opposing second edge defining a first lateral outer region, a second lateral outer region, and a central region disposed between the first lateral outer region and the second lateral outer region relative to a transverse axis of the guide member;
- wherein the guide member includes a plurality of fingers disposed on the first lateral outer region and a plurality of fingers disposed on the second lateral outer region of the second edge, wherein the plurality of fingers of each of the first lateral outer region and the second lateral outer region extend away from the first edge of the body and into the feed gap such that the enveloping material is disposed between and engaged by the plurality of fingers of each of the first lateral outer region and the second lateral outer region, and the feed roller; and
- wherein the central region of the second edge does not extend into the feed gap such that the enveloping material is not engaged by the central region of the guide body.

8. The round baler set forth in claim 7, wherein the plurality of fingers are permanently disposed within the feed gap for continuously positioning the enveloping material against the feed roll.

9. The round baler set forth in claim 7, wherein the guide member is an elastic material.

10. The round baler set forth in claim 9, wherein the guide member is a plastic material.

11. The round baler set forth in claim 7, wherein the transverse axis of the guide member extends parallel with the feed roller and across the width of the pressing chamber.

12. The round baler set forth in claim 7, wherein the first lateral outer region and the second lateral outer region each includes a length along the transverse axis that is less than a length of the central region along the transverse axis.

* * * * *